United States Patent
Huang et al.

(10) Patent No.: US 9,310,999 B2
(45) Date of Patent: Apr. 12, 2016

(54) INPUTTING TONE AND DIACRITIC MARKS BY GESTURE

(71) Applicant: Google Inc., Mountain View, CA (US)

(72) Inventors: Hao Huang, Beijing (CN); Zhiheng Li, Beijing (CN)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/909,151

(22) Filed: Jun. 4, 2013

(65) Prior Publication Data

US 2014/0354549 A1      Dec. 4, 2014

(51) Int. Cl.
*G06F 3/02*      (2006.01)
*G06F 3/0488*      (2013.01)
*G06F 3/023*      (2006.01)

(52) U.S. Cl.
CPC .......... *G06F 3/04886* (2013.01); *G06F 3/0233* (2013.01); *G06F 3/04883* (2013.01)

(58) Field of Classification Search
CPC ............ G06F 3/04886; G06F 3/04883; G06F 3/0233; G06F 3/0488; G06F 3/0202; G06F 3/0219
USPC .................................................. 345/168, 171
See application file for complete search history.

(56) References Cited

U.S. PATENT DOCUMENTS

| | | | |
|---|---|---|---|
| 8,286,104 B1* | 10/2012 | Yonge-Mallo | 715/863 |
| 8,352,260 B2 | 1/2013 | Sung | |
| 2003/0006967 A1 | 1/2003 | Pihlaja | |
| 2010/0070268 A1* | 3/2010 | Sung | 704/203 |
| 2012/0162086 A1* | 6/2012 | Rhee et al. | 345/171 |
| 2012/0326988 A1 | 12/2012 | Woo | |

* cited by examiner

*Primary Examiner* — Towfiq Elahi
(74) *Attorney, Agent, or Firm* — Remarck Law Group PLC

(57) ABSTRACT

Methods and systems for inputting tone and diacritic marks by gesture are provided. A method may include displaying a keypad for text input. Selection of a key and a gesture may be received. The gesture input may be semantically linked to a phonological property, a diacritic property, and/or a tone. A gesture input may include a substantially horizontal movement to the right associated with a first tone, a movement up and to the right associated with a second tone, a movement down and to the right, then up and to the right associated with a third tone, and a movement down and to the right associated with a fourth tone. A grapheme may be displayed based upon the selected key and the received gesture. With the diacritic and/or tone information, a grapheme may be predicted which may help to reduce the effort and speed of input.

28 Claims, 8 Drawing Sheets

INPUTTING TONE AND DIACRITIC MARKS BY GESTURE

BACKGROUND

In general, some spoken and written languages can include the use of tones and diacritic marks to convey meaning and significance to characters, letters, words, phrases, and the like. In many instances, the use of tones and diacritical marks can significantly alter the meaning of a character, letter, word, or phrase in a language. However, the input of tones and diacritical marks when typing on a device, such as a touch screen device, can be difficult due to various factors. Some of these factors may include, for example, the small size of a touch screen, limited keyboard functions, and lack of intuitive input techniques that a user can easily remember.

BRIEF SUMMARY

According to an embodiment of the disclosed subject matter, a method includes displaying a keypad for text input, the keypad including a plurality of keys. Input indicating a selection of a key from the plurality of keys may be received. Next, a gesture input may be received, wherein the gesture input is associated with one gesture of a set of gestures, each gesture in the set being semantically linked to at least one property such as a phonological property and/or a diacritic property. As a result, a grapheme may be displayed based upon the selected key and the at least one property semantically linked to the received gesture.

An implementation of the disclosed subject matter provides a system including a processor configured to display a keypad for text input, the keypad including a plurality of keys. Input indicating a selection of a key from the plurality of keys may be received. A gesture input may be received, wherein the gesture input is associated with one gesture out of a set of gestures, each gesture in the set being semantically linked to at least one property selected from: a phonological property and a diacritic property. Next, a grapheme may be displayed based upon the selected key and at least one of the phonological property and the diacritic property semantically linked to the received gesture.

According to an implementation of the disclosed subject matter, a method may include displaying a keypad for text input, the keypad including a plurality of keys. Input may be received indicating a selection of a key from the plurality of keys. A gesture input may be received, wherein the gesture input is associated with one gesture of a set of gestures, each gesture in the set being semantically linked to a tone. The set of gestures may include a substantially horizontal movement associated with a first tone, a movement both horizontal and vertical in a first direction associated with a second tone, a movement both horizontal and vertical in a second direction, then a movement both horizontal and vertical in a third direction associated with a third tone, and a movement both horizontal and vertical in a fourth direction associated with a fourth tone. Next, a grapheme may be displayed based upon the selected key and the tone associated with the received gesture.

An implementation of the disclosed subject matter provides a system including a processor configured to display a keypad for text input, the keypad including a plurality of keys. Input may be received indicating a selection of a key from the plurality of keys. A gesture input may be received, wherein the gesture input is associated with one gesture out of a set of gestures, each gesture in the set being semantically linked to a tone. The set of gestures may include a substantially horizontal movement associated with a first tone, a movement both horizontal and vertical in a first direction associated with a second tone, a movement both horizontal and vertical in a second direction, then a movement both horizontal and vertical in a third direction associated with a third tone, and a movement both horizontal and vertical in a fourth direction associated with a fourth tone. A grapheme may be displayed based upon the selected key and the tone associated with the received gesture.

Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
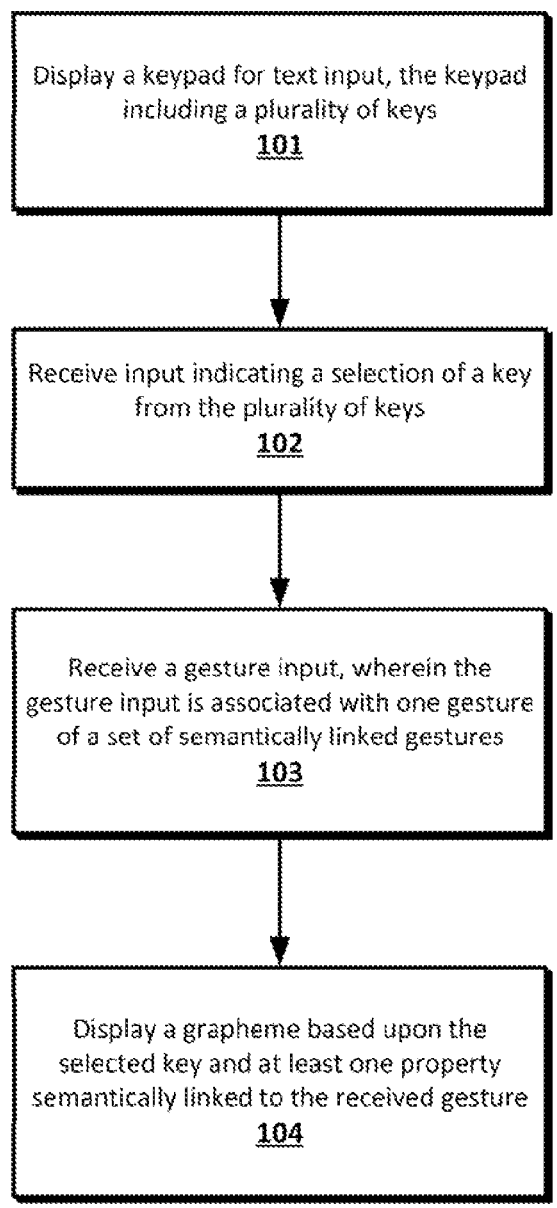
FIG. 1 shows an example process according to an implementation of the disclosed subject matter.

Input of Chinese Pinyin (as well as other tonal language) characters and tone can be difficult on some devices, such as touch screen devices. There are 4 basic tones in Mandarin Chinese, and these can be denoted as 1, 2, 3, and 4. Tone 1, or "Yin Ping," is a flat or high level tone, Tone 2 ("Yang Ping,") is a rising or high-rising tone, Tone 3 ("Shang") is a falling-rising or low tone, and Tone 4 ("Qu") is a falling or high-falling tone. Because the meaning of each character in Chinese varies based on the tone given to the character, it may be important to indicate tone when typing. For example, mā (Tone 1), má (Tone 2), mǎ (Tone 3), mà (Tone 4), and ma (no tone, sometimes referred to as Tone 5) each have a different meaning based on the tone. Specifically, mā (Tone 1) may mean "mother", má (Tone 2) may mean "hemp", mǎ (Tone 3) may mean "horse", mà (Tone 4) may mean "scold", and ma (Tone 5) is a question particle. With regard to typing of Chinese Pinyin characters and indicating tone, there is a lack of intuitive input techniques, and as a result, it can be very difficult for a user to quickly and efficiently type on a device, such as a touch screen device. For example, in order to type the word "名字" or "míng zì" ("name") in Chinese Pinyin with tone, a user would have to type "ming2 zi4" indicating ming with Tone 2 and zi with Tone 4. Therefore, it can be very cumbersome for a user to input each Chinese Pinyin character and each corresponding tone when typing on a touch screen device.

As another example, in some languages that use Latin alphabets, there may be a distinction between homonyms, such as in the French language. The word "là" includes the letter "a" with a diacritic grave mark and means "there." On the other hand, "la" without a diacritic mark means "the." Both "là" and "la" are pronounced [la], which emphasizes the importance of the difference in meaning conveyed by the use of diacritic marks. Other examples include dakuten, handakuten, hiragana/katakana (eg. ざ ザ and パ) in Japanese, as well as tashkil and harakat in Arabic. Given the large number of possible combinations of diacritic marks and letters, it can be difficult to input letters and corresponding diacritic marks quickly and efficiently when typing on device, such as a touch screen device.

Implementations of the disclosed subject matter provide methods, systems, and products for efficiently inputting tone and/or a diacritic property when typing on a touch screen device. The method includes displaying a keypad for text input, the keypad including a plurality of keys. Input indicating a selection of a key from the plurality of keys may be received. Next, a gesture input may be received that indicates additional information about the input desired by the user. For example, the gesture input may be associated with one gesture of a set of gestures, each of which is semantically linked to at least one property including a phonological property and a diacritic property. As a result, a grapheme may be displayed based upon the selected key and the at least one property semantically linked to the received gesture.

According to an implementation of the disclosed subject matter, a method may include displaying a keypad for text input, the keypad including a plurality of keys. Input may be received indicating a selection of a key from the plurality of keys. A gesture input may be received, and the gesture input may be associated with one gesture of a set of gestures. Each gesture in the set may be semantically linked to a tone. The set of gestures may include a substantially horizontal movement associated with a first tone, a movement both horizontal and vertical in a first direction associated with a second tone, a movement both horizontal and vertical in a second direction, then a movement both horizontal and vertical in a third direction associated with a third tone, and a movement both horizontal and vertical in a fourth direction associated with a fourth tone. Next, a grapheme may be displayed based upon the selected key and the tone associated with the received gesture.

As shown in FIG. 1, an implementation of the disclosed subject matter provides a system including a processor configured to display a keypad for text input, the keypad including a plurality of keys, at 101. At 102, input indicating a selection of a key from the plurality of keys may be received. A gesture input may be received and the gesture input may be associated with one gesture out of a set of gestures and each gesture in the set may be semantically linked to at least one property, such as a phonological property and a diacritic property, at 103. Next, a grapheme may be displayed based upon the selected key and at least one of the phonological property and the diacritic property semantically linked to the received gesture, at 104.

Figure 2:
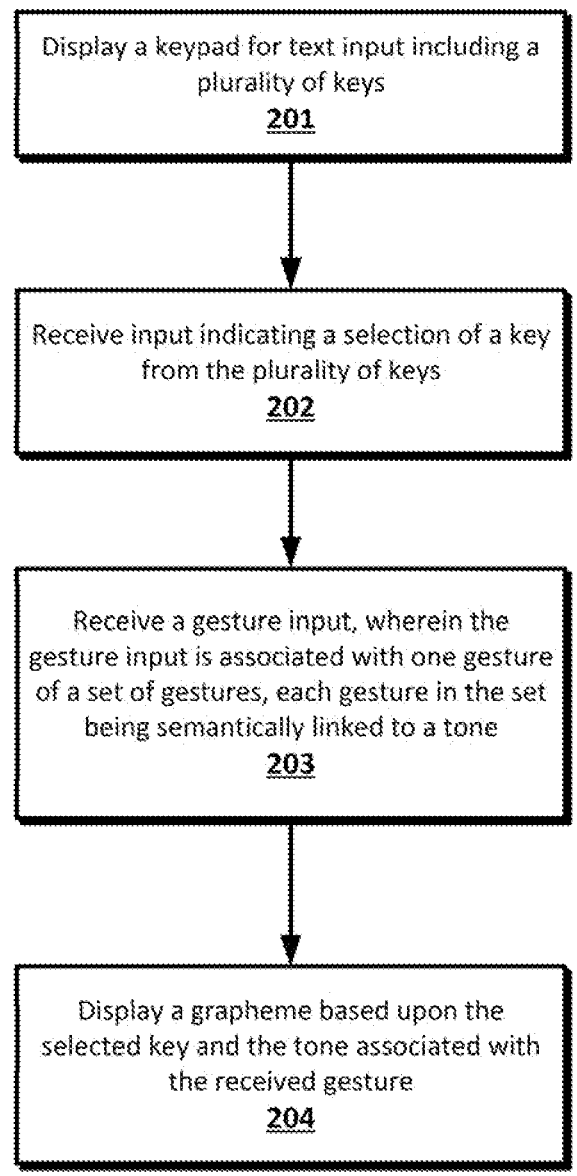
FIG. 2 shows an example process according to an implementation of the disclosed subject matter.

As shown in FIG. 2, an implementation of the disclosed subject matter provides a system that includes a processor configured to display a keypad for text input, the keypad including a plurality of keys, at 201. At 202, input may be received indicating a selection of a key from the plurality of keys. At 203, a gesture input may be received, and the gesture input may be associated with one gesture out of a set of gestures. Each gesture in the set may be semantically linked to a tone, and the set of gestures may include a substantially horizontal movement associated with a first tone, a movement both horizontal and vertical in a first direction associated with a second tone, a movement both horizontal and vertical in a second direction, then a movement both horizontal and vertical in a third direction associated with a third tone, and a movement both horizontal and vertical in a fourth direction associated with a fourth tone. For example, a substantially horizontal movement to the right may be associated with a first tone, a movement up and to the right may be associated with a second tone, a movement down and to the right, then up and to the right may be associated with a third tone, and a movement down and to the right may be associated with a fourth tone. Next, a grapheme may be displayed based upon the selected key and the tone associated with the received gesture, at 204.

A keypad for text input may include a plurality of keys for text input. The keys for text input may include characters, letters, symbols, punctuation marks, numbers, and any other keys used for input of text. Input indicating selection of a key may include movement of a physical object, such as a stylus, a finger, or the like, proximate to the surface of a touch screen device upon which a keypad is displayed. Input indicating selection of a key may also include pressing of a key on a tactile keyboard. Additionally, input indicating selection of a key may include a gesture input associated with text input, such as a gesture input associated with one or more characters, letters, symbols, punctuation marks, numbers, words, phrases, and any other input of text. As an example, input indicating selection of a key may be based on a gesture input, followed by a second gesture input associated with a phonological property and/or diacritic property.

A gesture input may include movement of a physical object, such as a stylus, a finger, or the like, proximate to the surface of a touch screen device. For example, a gesture may be received by a user moving, swiping, dragging, sliding, drawing, and/or tapping his finger on the touch screen of a touch screen device. Further, a gesture movement may be continuous, such as a constant movement of a finger on a touch screen without any interruption or lifting of the finger. A gesture movement may also include interruptions such as a pause, a stop, a tap, a change in direction, and any combination of movements and interruptions. As another example, a gesture may be mirrored horizontally, such as when there is no room near the edge of a touch screen. Additionally, a gesture movement within a set of gestures may be differentiated from other gestures in the set based on the speed of a movement. A gesture input may also include the movement of a device relative to a starting position. As another example, a gesture may be received by a user moving, waving, and/or tapping his device relative to a starting position in the air. For example, a user may input a gesture by holding his phone and moving the device from a starting point to an end point, such as by waving the device in the air.

Additionally, a user may define a gesture and/or a set of gestures to be semantically linked to a diacritic property and/or a phonological property. For example, a user may define the gesture of sliding to the right horizontally to denote the diaeresis umlaut ( ). As another example, a user may define the gesture of drawing a circle to denote Tone 3 (Falling-Rising or Low Tone) in Mandarin Chinese. Other gestures and sets of gestures may be used and defined by a user, where each gesture is defined to be associated with a corresponding tone, diacritic, or the like. A defined gesture and/or set of gestures may be specifically linked to a particular language, alphabet, application, and the like, and vary from one language, alphabet, application, and the like to another.

A phonological property as used herein may include a property associated with the systematic organization of sounds in a language. Further, a phonological property may be a sound function within a given language or across languages to encode meaning, such as a sound, a tone, a phoneme, an accent, a stress, a syllable, onset and rhyme, an articulatory gesture, an articulatory feature, a mora, and any other sound function within a language for conveying meaning. A phonological property may be one phonological property of a set of phonological properties. A set of phonological properties may be a finite group of related properties that encompass all options within a particular language. For example, there are 4 basic tones in Mandarin Chinese, and these can be denoted as 1, 2, 3, and 4. A set of phonological properties for the Mandarin Chinese language may include Tone 1, Tone 2, Tone 3, and tone 4.

A diacritic property as used herein may include, a glyph, a mark, or the like, added to a character to change the sound value of the character to which it is added. For example, a diacritic property may be an accent, a dot, a ring, a vertical line, a horizontal line, an overlay, a curve, a curl, a tilde, a comma, a titlo, an apostrophe, a bar, a colon, a hyphen, any other glyph added to a character in a language to indicate the unique meaning associated with the character to which it is added, and any other glyph added to a character in a language to indicate the sound value of the character to which it is added. Additionally, a diacritic property may be a punctuation mark, a symbol, and a set of symbols associated with a language, an alphabet, a dialect, and the like. A diacritic property may be one diacritic property of a set of diacritic properties. A set of diacritic properties may be a finite group of related properties that encompass all options within a particular language. For example, the Spanish language includes the use of diacritic marks such as the acute accent mark ( ´ ), the diaeresis umlaut (), and the tilde (~). A set of diacritic properties for the Spanish language may include ( ´ ), (), ( ¡ ), and (~).

Figure 3:
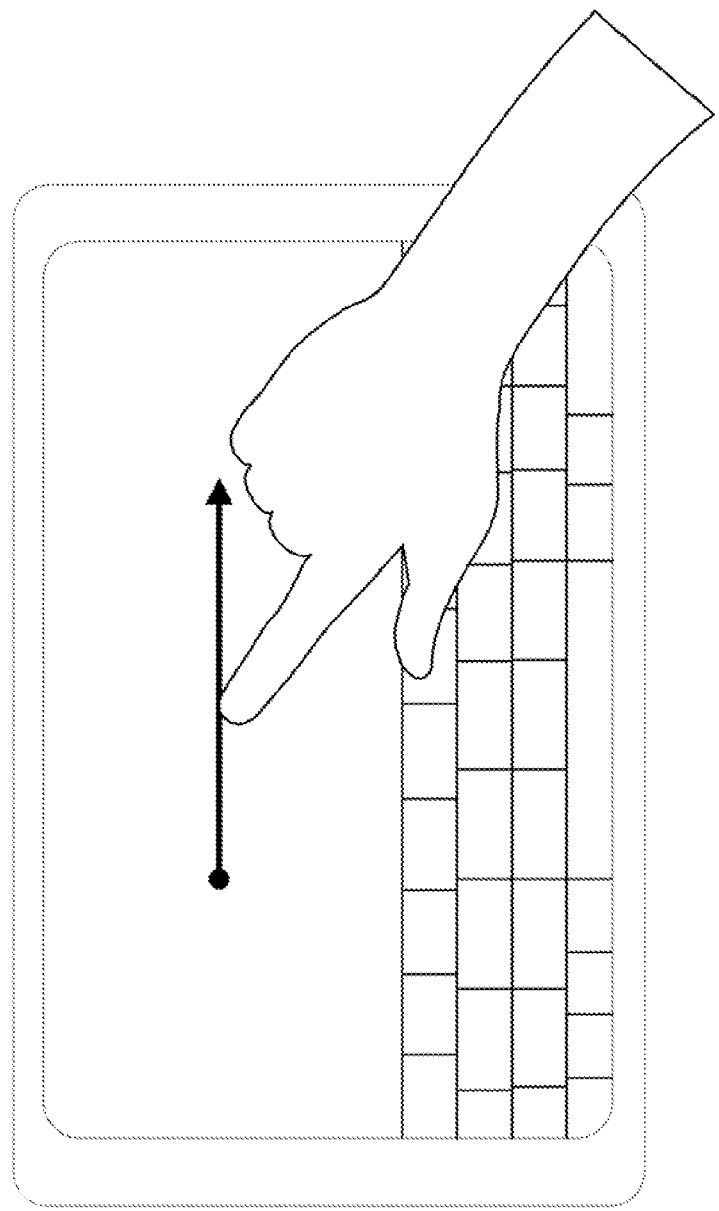
FIG. 3 shows an example gesture input according to an implementation of the disclosed subject matter.
Figure 4:
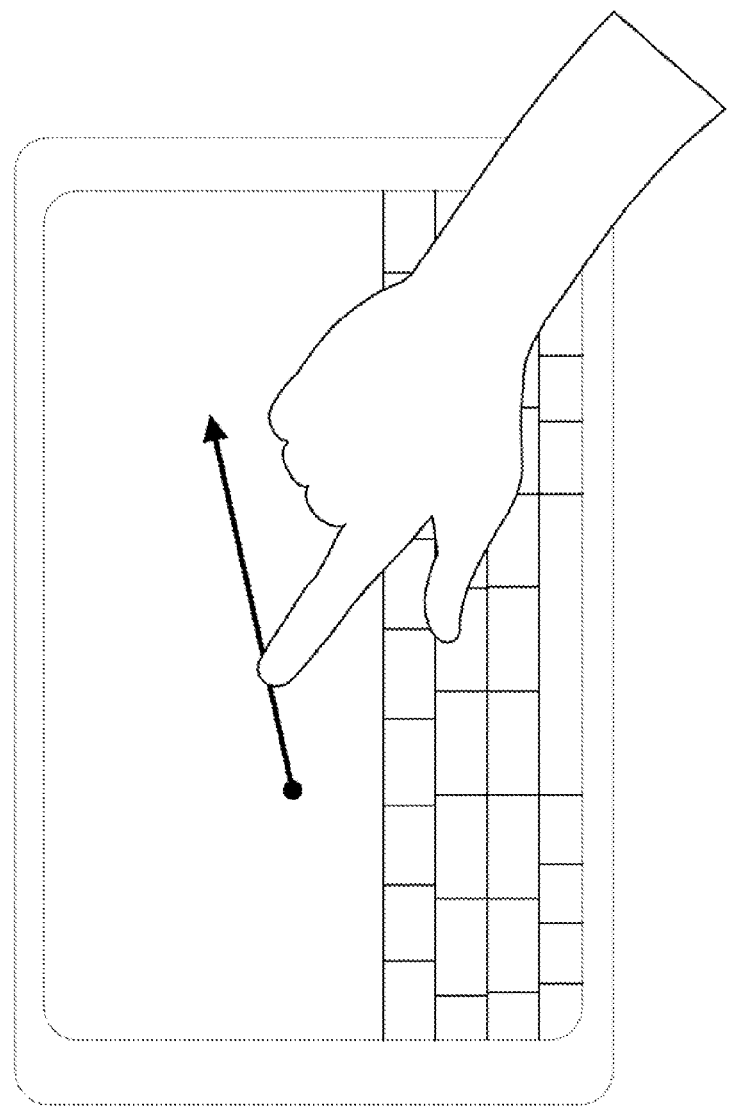
FIG. 4 shows an example gesture input according to an implementation of the disclosed subject matter.
Figure 5:
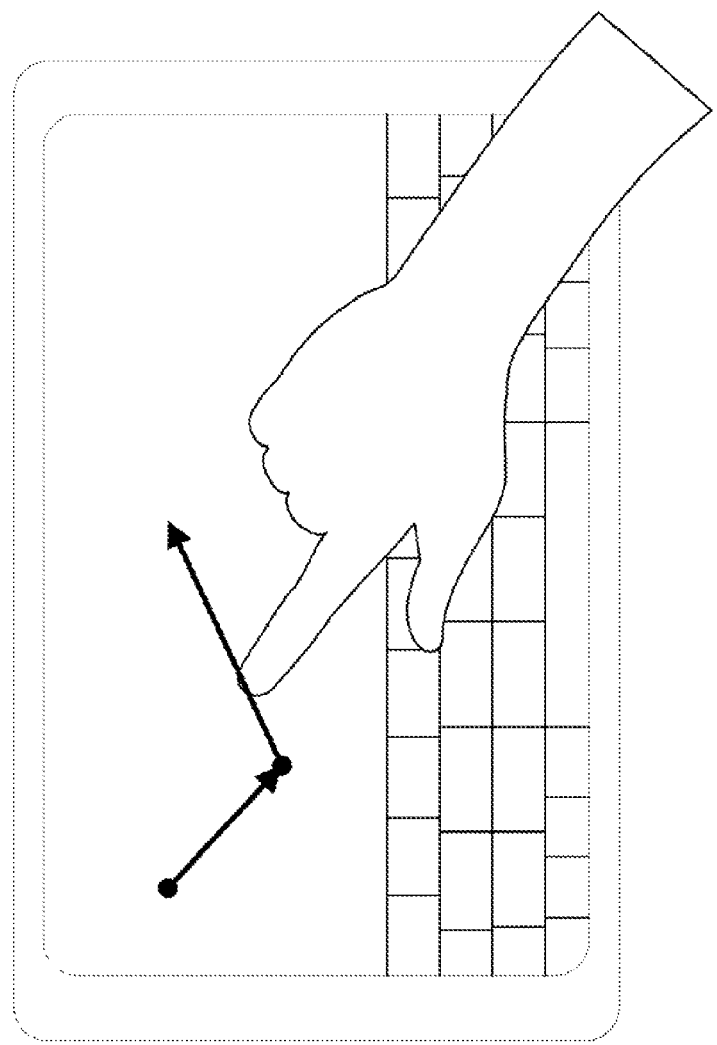
FIG. 5 shows an example gesture input according to an implementation of the disclosed subject matter.
Figure 6:
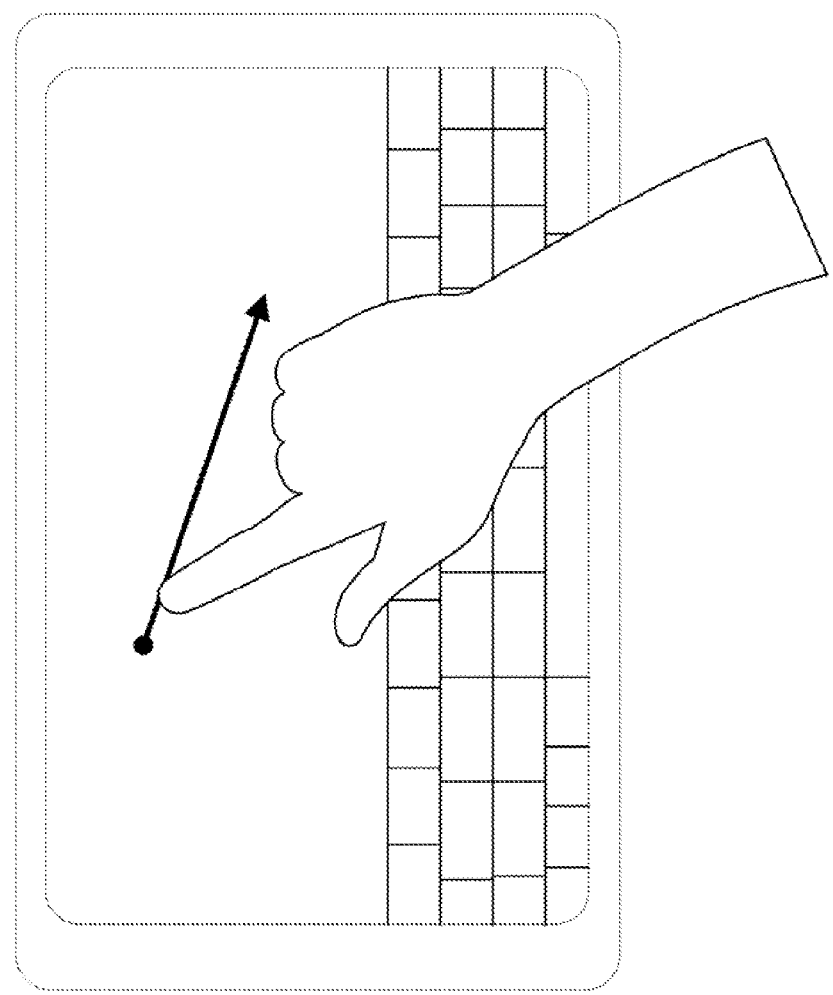
FIG. 6 shows an example gesture input according to an implementation of the disclosed subject matter.

A gesture input may be semantically linked to a phonological property. Specifically, a gesture input may be associated with a phonological property such that the gesture is intuitively indicative of the way a phonological property sounds. For example, as shown in FIGS. 3-6, an intuitive mapping of Mandarin Chinese tones to gestures may be to denote tone 1 (Flat or High Level Tone) as a substantially horizontal movement such as sliding to the right horizontally as shown in FIG. 3; Tone 2 (Rising or High-Rising Tone) as a movement both horizontal and vertical in a first direction such as as sliding to the upper right as shown in FIG. 4; tone 3 (Falling-Rising or Low Tone) as a movement both horizontal and vertical in a second direction, then a movement both horizontal and vertical in a third direction such as sliding to lower right first, then upper right as shown in FIG. 5; and Tone 4 (Falling or High-Falling Tone) as a movement both horizontal and vertical in a fourth direction such as sliding to the lower right as shown in FIG. 6. Each of the first, second, third, and fourth directions may or may not be the same direction. According to an implementation, the first tone or tone 1 may be Yin Ping; the second tone or Tone 2 may be Yang Ping; the third tone or Tone 3 may be Shang; and the fourth tone or Tone 4 may be Qu. Thus, in this example, the general shape of the gesture matches or is similar to the "shape" traditionally associated with the corresponding tone. Other gestures and sets of gestures may be used, where each gesture is similarly associated with the corresponding tone, diacritic, or the like.

For example, gestures on a touch screen device may be used to indicate tone. A user may select a key representing a letter and swipe his finger in a specific direction to indicate a tone associated with the letter. For example, the Pinyin input with tone for "good bye" in English is "zai4 jian4" representing "zai" with Tone 4 and "jian" with Tone 4. Rather than having to type "zai4 jian4", a user may input the full Pinyin and a gesture to indicate tone. The user may input "zai" followed by a swipe in the lower right direction to indicate Tone 4. As a result, "zài" or "再" may be displayed. Next, the user may input "jian" followed by a swipe in the lower right direction to indicate Tone 4. As a result, "jiàn" or "见" may be displayed. The gesture may be made immediately following, or as a part of, an earlier gesture or other input that is used to select a letter. Continuing the example, where a user is using a touch-sensitive screen displaying a keyboard to enter the letters "zai," the first swipe to the lower right may be made after the user presses the screen to select "i", without the user lifting his finger from the screen. More generally, gestures as disclosed herein may be made as part of, immediately following or preceding, or entirely separate from a gesture or other input that is provided to select a letter, word, or other item.

Figure 7:
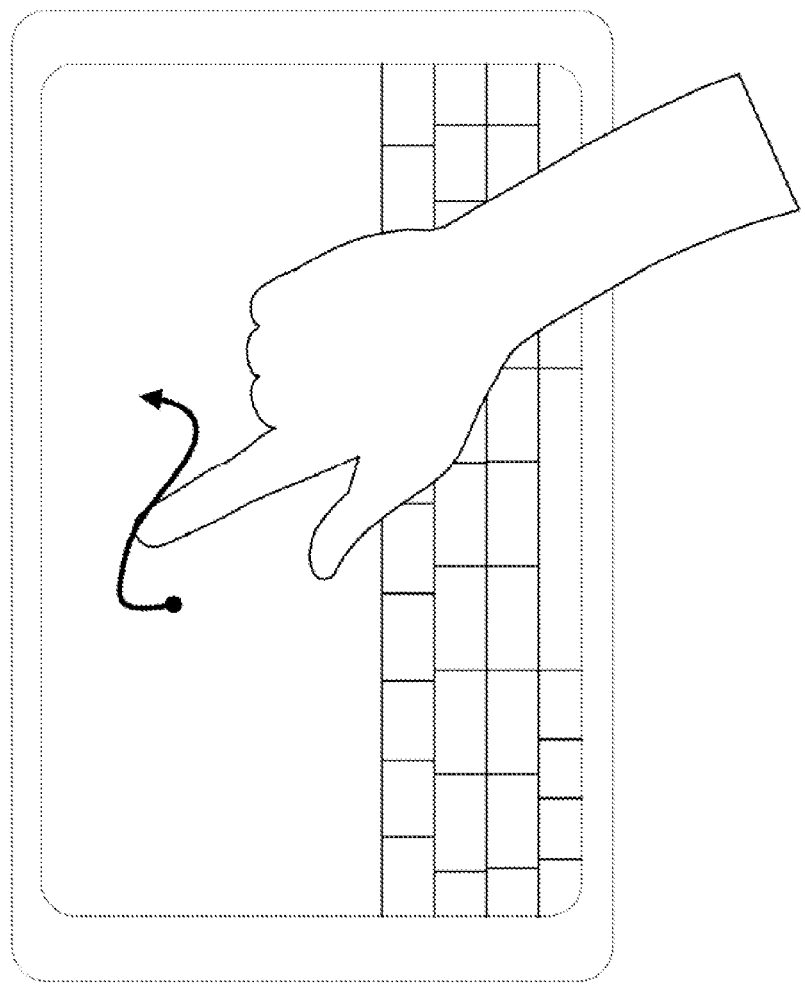
FIG. 7 shows an example gesture input according to an implementation of the disclosed subject matter.

In implementations of the disclosed subject matter, a gesture input may be semantically linked to a diacritic property. In particular, a gesture input may be associated with a phonological property such that the gesture is intuitively indicative of the way a diacritic property looks. As an example, the gesture for each of a set of diacritic marks may include a gesture portion that matches the shape of the diacritic mark. For example, an intuitive mapping of Spanish language diacritic marks may be to denote each diacritic mark corresponding to a gesture movement which imitates the shape of the diacritic mark. As an example, an intuitive mapping of Spanish language diacritic marks may be to denote the acute accent mark ( ´ ) as sliding to the upper right; the diaeresis umlaut () as two consecutive taps; and the tilde (~) as continuously sliding to the upper right, then to the lower right, and then to the upper right as shown in FIG. 7.

For example, a user may wish to type the Spanish words "Feliz Cumpleaños" or "Happy Birthday" in English. A user may select keys for inputting f-e-l-i-z followed by c-u-m-p-l-e-a-n, followed by a gesture, such as sliding to the upper right, then to the lower right, and then to the upper right, as shown in FIG. 7. As a result, the letter "ñ" may be displayed. The user may finish by selecting keys for inputting o-s.

In general, a grapheme is the smallest semantically distinguishing unit in a written language, analogous to the phonemes of spoken languages. A grapheme may or may not carry meaning by itself, and may or may not correspond to a single phoneme. A grapheme may be a character, a letter, a word, a symbol, a syllable, a punctuation mark, a numeral, a pinyin, and any other unit or symbol of a written language. For example, a grapheme may be any one of "ming zì," "míng," "m," "zì," "i," or "z." Additionally, a grapheme may be a modified version of a character associated with a selected key. For example, a user may select keys for inputting "n" followed by a gesture, such as sliding to the upper right, then to the lower right, and then to the upper right, as shown in FIG. 7. As a result, a modified version of the selected key "n", in particular, the character "ñ" may be displayed. A grapheme may be a modified version of a word associated with the selected key or a plurality of selected keys. As an example, a user may select keys for inputting the Spanish word for the verb "tener" followed by a gesture to indicate a conjugation of the verb. A user may slide upward to indicate the "we" subject pronoun. As a result, a modified version of "tener", in particular, "tenemos" may be displayed.

Upon receiving selection of a key and a gesture input, a grapheme may be displayed based on the selected key and the received gesture. According to an implementation, a plurality of candidate graphemes may be displayed based on the selected key and the received gesture. From among the plurality of candidate graphemes displayed, a best-guess option may be selected and displayed automatically based on whether a user continues inputting text and/or gestures. Additionally, the user may select a grapheme from among the plurality of candidate graphemes. For example, some Input Method Editors (IMEs) that are used to type in Chinese or other languages may have a "buffer" that displays a plurality of candidate graphemes based on the IME's prediction of what a user is trying to input based on input and/or gestures received. In this case, a best-guess option may be inserted automatically if the user continues typing as there are often multiple possible candidate graphemes for a given input and/or gesture, such as a Chinese Pinyin (sound+tone) entry.

In an implementation, the remaining characters in a grapheme and/or part of a grapheme may be predicted. Such a prediction may assign a probability distribution to graphemes, such as characters, in a language or an alphabet corresponding to the probability of each character being next in the input stream. The prediction feature may be based on known combinations of a particular character and at least one of a phonological and a diacritic property within a given language. For example, in order to type the word "名字" or "míng zì" or "name" in Chinese Pinyin with tone, previously a user would have to type "ming2 zi4" indicating ming with Tone 2 and zi with Tone 4. According to an implementation, a user wishing to type "míng zì" may type "m" followed by a swipe in the upper right direction to indicate Tone 2 and then type "z" followed by a swipe in the lower right direction to indicate Tone 4. As a result, "m2 z4" may be displayed. Furthermore, the prediction feature may include a database of all possible Chinese pinyin from which it may be determined that "m" with Tone 2 followed by "z" with tone 4 is limited to a set number of phrases that include a first pinyin beginning with the letter "m" spoken with Tone 2 followed by a second pinyin beginning with the letter "z" spoken with Tone 4. As a result, the system may be able to predict that the user is most likely intending to type "名字" or "míng zì". As a result, the word "名字" or "míng zì" may be displayed on the screen. The predictive feature may allow a user to input only a consonant and tone, thereby greatly reducing the time and effort required to type a pinyin with tone.

The prediction feature may also take into account the context of a grapheme based on other graphemes near or adjacent to the grapheme. For example, selection of the keys f-e-l-i-z, space, c-u-m-p-l-e-a-n may be received. Next, a gesture input, as shown in FIG. 7 may be received such as sliding to the upper right, then to the lower right, and then to the upper right, indicating a tilde (~) associated with the last received letter "n," as a result, ñ may be displayed. The prediction feature may determine that a first word "feliz" followed by a second word beginning with "cumplean" is most likely the phrase "feliz cumpleaños." As a result, the remaining characters in the grapheme may be predicted, for example, the letters o-s.

As another example, a user may wish to input "zài jiàn." One option may be that the user simply inputs a consonant plus a swipe for tone and the grapheme may be predicted. For example, "z4 j4" may be inputted on a touch screen by selecting the "z" key followed by a swipe in the lower right direction to indicate Tone 4 and selecting the "j" key followed by a swipe in the lower right direction to indicate Tone 4. Based on the input of "z" and the gesture for tone 4 following by input of "j" and the gesture for Tone 4, the remaining characters in the grapheme may be predicted, and it may be determined that the user is intending to type "zài jiàn." As a result, "zài jiàn", "z4 j4", or "再见" may be displayed. Additionally, selection of the "z" key followed by a swipe in the lower right direction to indicate Tone 4 may be input. Based on the input of "z" and the gesture for Tone 4, it may be predicted that the user is intending to type "zài." This prediction may be based on information indicating that there are a set number of Chinese pinyin graphemes that begin with the letter z and have Tone 4. Further, the remaining part of the grapheme may be predicted, for example, "jiàn." This prediction may be based on information that "zài" with Tone 4 is typically followed by "jiàn."

As discussed above, selection of a key and a gesture input may be received on a mobile device. A mobile device may include a smartphone, a tablet, a wearable computer, a phone, a laptop, a wireless device, and any other device capable of receiving a selection of a key and a gesture input.

In an implementation, the communication between a device and a grapheme provider may be across one or more bridges between the interfaces. For example, the communications between the device and the grapheme provider may be managed or assisted by a third device, such as, a coordinating device, a local coordinator, a remote server, etc. In such cases, the third device may, for example, provide the selected key and gesture input received to the grapheme provider, in which case, the grapheme provider may provide the grapheme to be displayed at the device. Alternatively, the third device may receive a selected key and a gesture input from the device, and provide the selected key and gesture input to a prediction feature provider. The prediction feature provider may predict the remaining characters in a grapheme and/or part of a grapheme. Accordingly, the prediction feature provider may provide the remaining characters in a grapheme and/or part of a grapheme to the device. Furthermore, more than one intermediate device may be implemented to facilitate communication between devices, a grapheme provider, and prediction feature provider.

Figure 8:
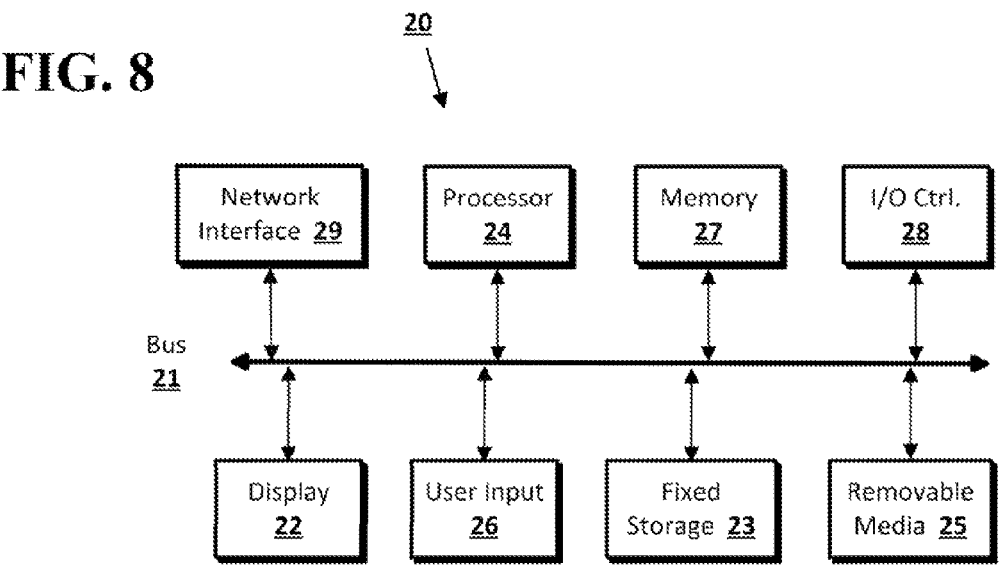
FIG. 8 shows a computer according to an embodiment of the disclosed subject matter.

Embodiments of the presently disclosed subject matter may be implemented in and used with a variety of component and network architectures. FIG. 8 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 9.

Many other devices or components (not shown) may be connected in a similar manner (e.g., document scanners, digital cameras and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
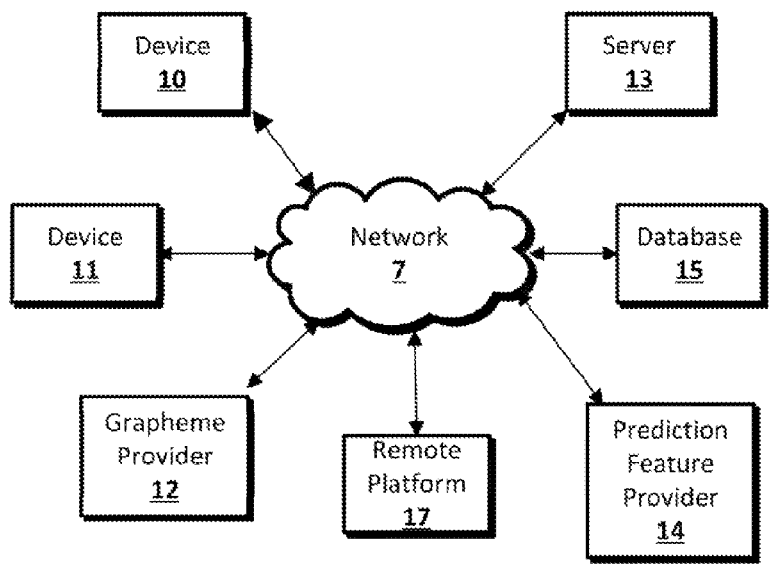
FIG. 9 shows a network configuration according to an embodiment of the disclosed subject matter.

FIG. 9 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more grapheme providers 12, prediction feature providers 14, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more grapheme providers 12, prediction feature providers 14, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. For example, while certain languages, scripts, phrases, words, and characters were chosen to illustrate the workings of the present disclosure, the teachings of the present disclosure are not so limited, and may apply to any appropriate language, script, and so on. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   displaying a keypad for text input to a user, the keypad including a plurality of keys,
   receiving input from the user indicating a selection of a key from the plurality of keys, the key representing a consonant,
   receiving a gesture input from the user, wherein the gesture input is associated with one gesture of a set of gestures, each gesture in the set being semantically linked as defined by the user to at least one property selected from: a phonological property and a diacritic property, and
   displaying a grapheme based upon the selected key and the at least one property semantically linked to the received gesture,
   wherein the grapheme is a modified version of a word associated with the selected key and the grapheme is predicted based on only the consonant and the at least one property associated with the received gesture.

2. The method of claim 1, wherein the phonological property is one phonological property of a set of phonological properties.

3. The method of claim 1, wherein the diacritic property is one diacritic property of a set of diacritic properties.

4. The method of claim 1, further comprising predicting a character that is part of the grapheme.

5. The method of claim 4, further comprising predicting any remaining characters in the grapheme.

6. The method of claim 1, wherein the grapheme includes at least one selected from a group consisting of: a character, a letter, a word, a symbol, a syllable, a punctuation mark, a numeral, and a pinyin.

7. The method of claim 1, wherein the phonological property is at least one selected from the group consisting of: a sound, a tone, a phoneme, an accent, a stress, and any other sound function within a language encoding meaning.

8. The method of claim 1, wherein the diacritic property is at least one selected from a group consisting of: an accent, a dot, a ring, a vertical line, a horizontal line, an overlay, a curve, a curl, a tilde, a comma, a titlo, an apostrophe, a bar, a colon, a hyphen, any other glyph added to a character in a language to indicate the unique meaning associated with the character to which it is added, and any other glyph added to a character in a language to indicate a sound value of the character to which it is added.

9. A method comprising:
displaying a keypad for text input, the keypad including a plurality of keys,
receiving input indicating a selection of a key from the plurality of keys, the key representing a consonant,
receiving a gesture input, wherein the gesture input is associated with one gesture of a set of gestures, each gesture in the set being semantically linked to a tone, and wherein the set of gestures comprises:
a substantially horizontal movement associated with a first tone,
a movement both horizontal and vertical in a first direction associated with a second tone,
a movement both horizontal and vertical in a second direction, then a movement both horizontal and vertical in a third direction associated with a third tone, and
a movement both horizontal and vertical in a fourth direction associated with a fourth tone, and
displaying a grapheme based upon the selected key and the tone associated with the received gesture,
wherein the grapheme is a modified version of a word associated with the selected key and the grapheme is predicted based on only the consonant and the tone associated with the received gesture.

10. The method of claim 9, further comprising predicting a character that is part of the grapheme.

11. The method of claim 10, further comprising predicting any remaining characters in the grapheme.

12. The method of claim 9, wherein the grapheme is at least one selected from a group consisting of: a character, a letter, a word, a symbol, a syllable, a punctuation mark, a numeral, and a pinyin.

13. The method of claim 9, wherein the first tone is Yin Ping, the second tone is Yang Ping, the third tone is Shang, and the fourth tone is Qu.

14. The method of claim 9, wherein the substantially horizontal movement associated with the first tone is a substantially horizontal movement to the right;
the movement both horizontal and vertical in the first direction associated with the second tone is a movement up and to the right;
the movement both horizontal and vertical in the second direction, then the movement both horizontal and vertical in the third direction associated with the third tone is a movement down and to the right, then up and to the right, and the movement both horizontal and vertical in the fourth direction associated with the fourth tone is a movement down and to the right.

15. A system comprising:
a processor configured to:
display a keypad for text input to a user, the keypad including a plurality of keys,
receive input from the user indicating a selection of a key from the plurality of keys, the key representing a consonant,
receive a gesture input from the user, wherein the gesture input is associated with one gesture out of a set of gestures, each gesture in the set being semantically linked as defined by the user to at least one property selected from: a phonological property and a diacritic property, and
display a grapheme based upon the selected key and at least one of the phonological property and the diacritic property semantically linked to the received gesture,
wherein the grapheme is a modified version of a word associated with the selected key and the grapheme is predicted based on only the consonant and the at least one property associated with the received gesture.

16. The system of claim 15, wherein the phonological property is one phonological property of a set of phonological properties.

17. The system of claim 15, wherein the diacritic property is one diacritic property of a set of diacritic properties.

18. The system of claim 15, further comprising predicting a character that is part of the grapheme.

19. The system of claim 18, further comprising predicting any remaining characters in the grapheme.

20. The system of claim 15, wherein the grapheme includes at least one selected from a group consisting of: a character, a letter, a word, a symbol, a syllable, a punctuation mark, a numeral, a pinyin, and any other unit of a written language.

21. The system of claim 15, wherein the phonological property is at least one selected from a group consisting of: a sound, a tone, a phoneme, an accent, a stress, and any other sound function within a language encoding meaning.

22. The system of claim 15, wherein the diacritic property is at least one selected from a group consisting of: an accent, a dot, a ring, a vertical line, a horizontal line, an overlay, a curve, a curl, a tilde, a comma, a titlo, an apostrophe, a bar, a colon, a hyphen, and any other glyph added to a character in a language to indicate a sound value of the character to which it is added.

23. A system comprising:
a processor configured to:
display a keypad for text input, the keypad including a plurality of keys,
receive input indicating a selection of a key from the plurality of keys, the selected key representing a consonant,
receive a gesture input, wherein the gesture input is associated with one gesture out of a set of gestures, each gesture in the set being semantically linked to a tone, and wherein the set of gestures includes:
a substantially horizontal movement associated with a first tone,
a movement both horizontal and vertical in a first direction associated with a second tone,
a movement both horizontal and vertical in a second direction, then a movement both horizontal and vertical in a third direction associated with a third tone, and a movement both horizontal and vertical in a fourth direction associated with a fourth tone, and display a grapheme based upon the selected key and the tone associated with the received gesture, wherein the grapheme is a modified version of a word associated with the selected key and the grapheme is predicted base on only the consonant and the tone associated with the received gesture.

24. The system of claim 23, further comprising predicting a character that is part of the grapheme.

25. The system of claim 24, further comprising predicting any remaining characters in the grapheme.

26. The system of claim 23, wherein the grapheme includes at least one selected from a group consisting of: a character, a letter, a word, a symbol, a syllable, a punctuation mark, a numeral, a pinyin, and any other unit of a written language.

27. The system of claim 23, wherein the first tone is Yin Ping, the second tone is Yang Ping, the third tone is Shang, and the fourth tone is Qu.

28. The system of claim 23, wherein the substantially horizontal movement associated with the first tone is a substantially horizontal movement to the right;

the movement both horizontal and vertical in the first direction associated with the second tone is a movement up and to the right;

the movement both horizontal and vertical in the second direction, then the movement both horizontal and vertical in the third direction associated with the third tone is a movement down and to the right, then up and to the right, and the movement both horizontal and vertical in the fourth direction associated with the fourth tone is a movement down and to the right.

\* \* \* \* \*